United States Patent [19]

Kondo

[11] Patent Number: 4,956,861
[45] Date of Patent: Sep. 11, 1990

[54] METHOD AND APPARATUS FOR ADDRESSEE LOCATION

[75] Inventor: Tetsuo Kondo, Yokohama, Japan

[73] Assignee: Hitachi, Ltd., Tokyo, Japan

[21] Appl. No.: 329,518

[22] Filed: Mar. 28, 1989

[30] Foreign Application Priority Data

Mar. 29, 1988 [JP] Japan .................................. 63-73391

[51] Int. Cl.$^5$ ............................................. H04M 3/54
[52] U.S. Cl. ..................................... 379/142; 379/201; 379/211; 379/214
[58] Field of Search ............... 379/201, 207, 218, 245, 379/210, 211, 212, 214, 142

[56] References Cited

U.S. PATENT DOCUMENTS

| 4,304,968 | 12/1981 | Klausner | 379/142 |
| 4,752,951 | 6/1988 | Konneker | 379/211 |

FOREIGN PATENT DOCUMENTS

| 0111366 | 9/1981 | Japan | 379/211 |
| 0094053 | 4/1987 | Japan | 379/211 |

Primary Examiner—James L. Dwyer
Attorney, Agent, or Firm—Antonelli, Terry, Stout & Kraus

[57] ABSTRACT

A method and an apparatus used with a private branch exchange for addressee location. An addressee notifies of his or her peresent location by a predetermined dialling operation from an extension telephone, other than an extension telephone allotted to him or her within the private branch exchange system, whereupon a switchboard of the system stores the location of the addressee in association with the extension telephone from which the notification was made. Upon arrival of an incoming call for the extension telephone allotted to the addressee, the switchboard transfers the call to a switchboard operation device which displays the addressee's location. The apparatus further comprises a character display section, the switchboard operation device adatped to operate the switchboard of the PBX system, a memory unit for storing the location name for each extension telephone connected to the switchboard and a profile of each specific addressee, an input unit for entering into the memory unit the location name of each extension telephone and the profile of each addressee, and a switchboard control unit which, upon a predetermined dialling operation by an addressee from an extension telephone other than the one allotted to hime or her, stores the addressee's location at that time point in the memory unit, and if a call arrives for the extension telephone allotted to the addressee under this condition, transfers the call to the switchboard operation unit while at the same time indicating the addressee's present location on the switchboard operation unit.

24 Claims, 4 Drawing Sheets

FIG.2A    FIG.2B    FIG.2C
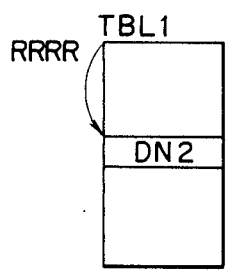
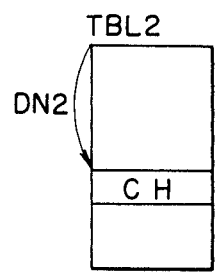
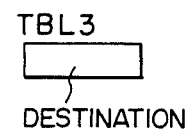
FIG.2D
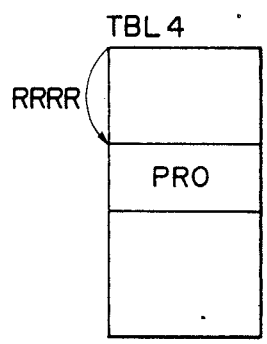
FIG.3
```
RN: NAME, MAN ----
GL: PLACE, ----
```

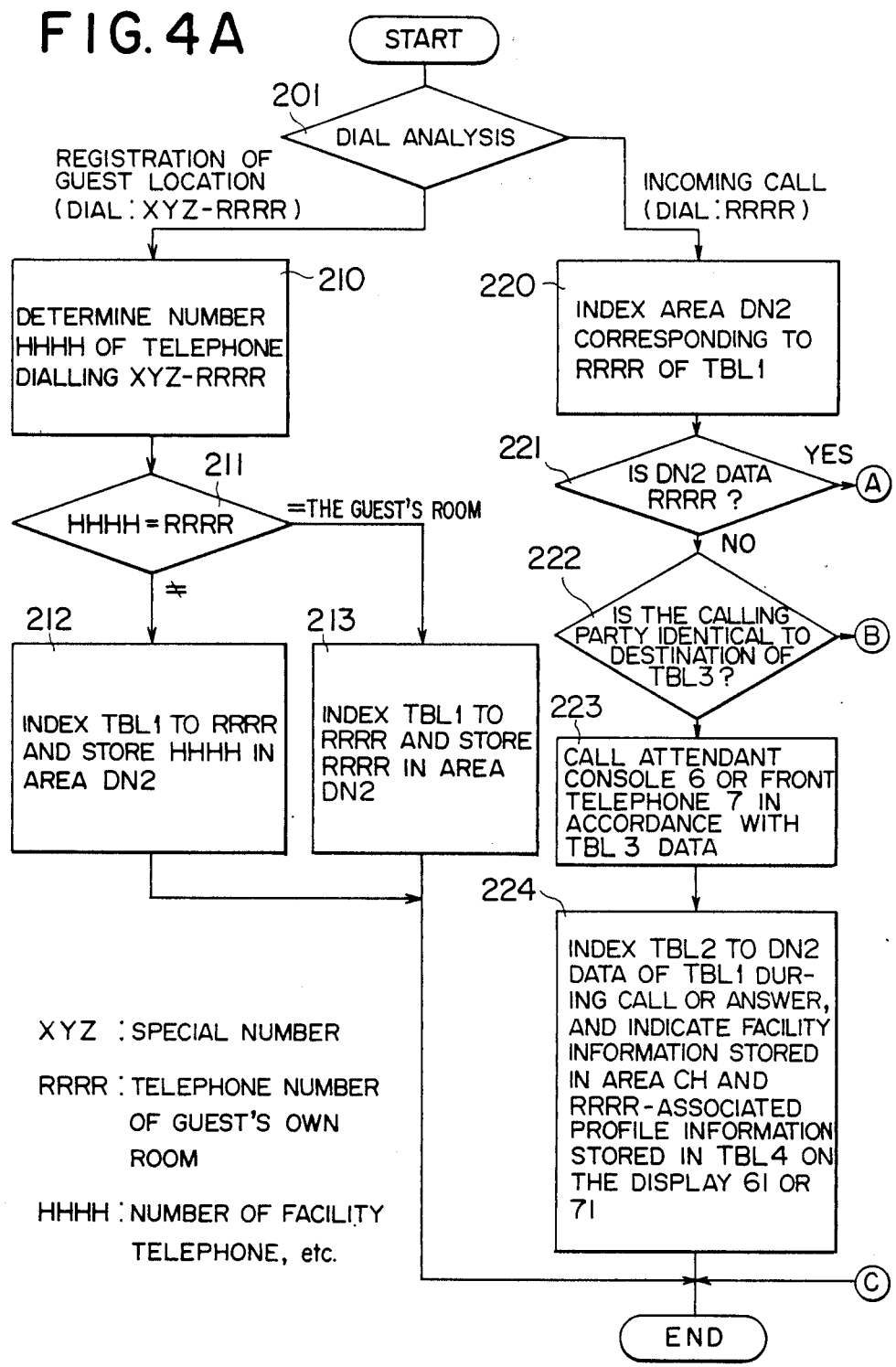

METHOD AND APPARATUS FOR ADDRESSEE LOCATION

BACKGROUND OF THE INVENTION

The present invention relates to a method and an apparatus for addressee location, or more in particular to a method and an apparatus wherein a specific person or addressee, who moves within specific premises covered by a private branch exchange (PBX), is accurately located if a call, whether extension or otherwise, arrives for his or her extension telephone.

The present invention is specifically applicable to a guest location system suitable for reaching by telephone a hotel guest who is using some hotel facilities outside of his or her room in the hotel.

In the case where a telephone call arrives at the hotel for a guest, for example, the guest could be reached if he or she stays in his or her room. If the guest is outside of his or her room, however, the attendant console or other telephone where the call arrives would be unaware that the guest is not in his or her room unless the guest has left a message at the console, and thus the contact of the guest by telephone would be delayed. In order to meet such a situation for improved guest services, conventional guest location systems operate in such a manner that when a guest is at some place outside his or her room and is desirous of being contacted by telephone at that particular place, the guest has the identification place stored in the exchange by an exclusive terminal unit so that a call addressed to his or her room, if any, may be transferred to the designated place of destination.

Various systems are known in the prior art in which apparatuses for generating locations from a specially provided input terminal are disclosed, for example "Equipment and Systems" No. 86, Sept. 5, 1986, pp. 12 to 15, published by Hitachi Ltd., and "Development of Composite Digital Telephone Exchange for Hotels", Exchange Research Paper SE86-132, The Institute of Electronics and Communication Engineers of Japan. Related patents include JP-A-No. 57-147363 disclosing a system for reading the facility where an addressee is situated from a given extension telephone, JP-A-No. 59-161992 disclosing an extension system, for indicating the profile of a calling party to the attendant console, and JP-A-No. 62-31298 relating to a configuration permitting the attendant console to refer to a database.

SUMMARY OF THE INVENTION

The conventional guest location systems described above require an exclusive terminal unit for storing in the switchboard data on the position of a guest in the switchboard, and are difficult to use for the purpose of hotel guests having their in-hotel positions stored in the switchboard, from the viewpoint of both the cost and size.

Accordingly, the object of the present invention is to provide a method and an apparatus for addressee location in which, if a hotel guest or the like specified by extension telephone is situated in a facility covered by an extension telephone system outside his or her room, communication is established easily at low cost upon the arrival of a call for the extension telephone number of the guest, by use of an ordinary extension telephone at his or her location and a character-display telephone having exchange control functions, such as the attendant console or hotel front desk telephone equipment.

According to the present invention, there is provided a method and apparatus for addressee location comprising means for attaching a facility name to each extension telephone set in a hotel and storing each of such names in an electronic automatic exchange of stored program control type, means for enabling a hotel guest to make a dial call from the telephone set of a particular facility used by him or her in the hotel thereby to enable an incoming call, if any, for the guest's room to be transferred to the attendant console or the front telephone, and means such as a character-display telephone set at the attendant console or the like for indicating the name and the present location of the guest who is the called party.

According to one aspect of the present invention, there is provided a method of addressee location for a private branch exchange, in which an addressee notifies or generates his or her present location by a predetermined dialling operation from an extension telephone within any of the facilities in an area covered by the PBX, other than the telephone allotted to the addressee, and with the notification or generation of a guest location, a switchboard of the PBX unit stores the location of the addressee other than his or her own extension telephone, so that when a call arrives for the extension telephone allotted to the addressee, the switchboard transfers the call to switchboard operation means in control of the particular switchboard, while at the same time indicating the addressee's location.

According to another aspect of the present invention, there is provided an apparatus for addressee location for implementing the above-mentioned method of addressee location, comprising switchboard operation means including a character display section in control of a switchboard of the private branch exchange, memory means for storing the names of locations for the respective extension telephones connected to the switchboard and the profiles for specific addressees, input means for entering the memory means with the location names of the extension telephones and the profiles of the addressees, and switchboard control means for storing in the memory means the location of an addressee dialling from an extension telephone other than the one allotted to him or her and transferring an incoming call, if any, for the addressee's own extension telephone to the switchboard operation means while at the same time indicating the present location of the particular addressee on the switchboard operation means.

In applications for guest locations in a hotel, for example, a hotel guest, staying in a facility other than his or her own room in the same hotel, dials the switchboard specifically from an ordinary extension telephone at his location, thereby to enable the switchboard to determine the facility where the guest is present. In the case where a telephone call arrives for the guest's room, the switchboard transfers the call to the attendant console or the like, and if the attendant console answers the call, the location of the guest involved is indicated on a character-display telephone installed on the attendant console or the like. As a result, the attendant console is informed that the guest is absent from his or her room and further is informed of the place he or she is situated, and thus the attendant at the console is capable of transferring the telephone call to the particular location or passing a message about the call to the guest.

BRIEF DESCRIPTION OF THE DRAWINGS

FIGS. 2A, 2B, 2C and 2D are diagrams showing examples of descriptions in various tables used with the configuration of FIG. 1.

FIG. 3 shows an example of a display of addressee information according to the embodiment of FIG. 1.

FIGS. 4A and 4B are flowcharts for explaining the operation of the embodiment shown in FIG. 1.

DESCRIPTION OF THE PREFERRED EMBODIMENTS

Figure 1:
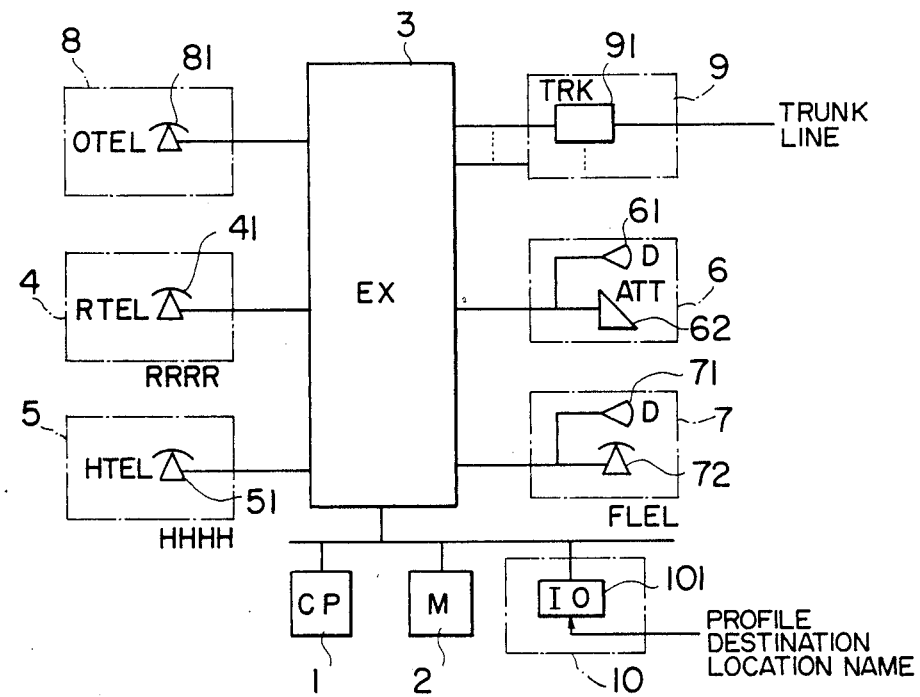
FIG. 1 is a block diagram showing a configuration of a private branch exchange system for performing embodying a method and embodying an apparatus for addressee location according to the present invention.

An embodiment of the present invention will be explained below with reference to the accompanying drawings. FIG. 1 shows a block diagram of a configuration of an apparatus applied to a hotel guest location according to the present invention.

According to this embodiment, a private branch exchange is made up of an electronic automatic exchange comprising a channel switch 3 (EX), a memory unit 2 (M) for storing an exchange program and data, and a central control unit 1 (CP) for controlling the channel switch 3 in accordance with the exchange program stored in the memory unit 2, thereby to control various exchange operations. This electronic automatic exchange is connected with a trunk group 9 having built therein a plurality of trunks 91, and further through the trunk group 9 to a trunk line or a specific,, exclusive line.

The electronic channel switch 3 is also connected to extension telephones 41, 81 (RTEL, OTEL) installed in hotel guest rooms 4, 8 on the one hand, and to an extension telephone (HTL) 51 of facilities 5, such as a restaurant and health gymnasium in the hotel, on the other.

The electronic automatic exchange further comprises an attendant console 6 and a front desk telephone 7 making up switchboard operation means adapted for switching and transferring a call on the trunk or extension line arriving at the electronic automatic exchange. The attendant console 6 includes a character-display (D) 6 and a keyboard (ATT) 62, and the front desk telephone 7 includes a character display (D) 71 and an extension telephone 72 (FTEL) with an operating function.

Further, the private branch exchange is connected with input means 10, whereby the name of a location (such as REST) corresponding to the number of the extension telephone 51 installed in the hotel facility 5, such as restaurant or gymnasium is stored, together with the extension number of the extension telephone 51 in a predetermined table within the memory unit 2. Furthermore, the input means 10 is capable of storing the names, sexes and the like data of the guests staying in the rooms 4 and 8 in a predetermined table of the memory unit 2, together with the numbers of the extension telephones 41, 81 of the rooms 4, 8. Also, the input means 10 may be operated to write an instruction in a predetermined table of the memory unit 2 to transfer a trunk or extension call for the guest's room to the attendant console 6 or the front desk telephone 7, as will be explained in detail later in association with explanation of the operation of the apparatus according to the invention.

Figure 4B:
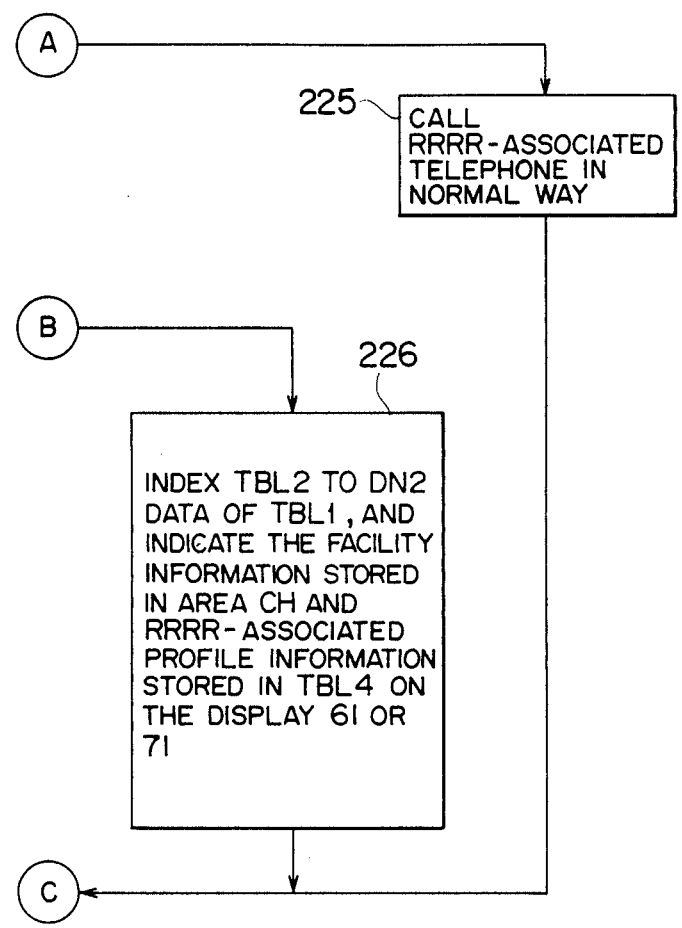

In an apparatus configured as described above, explanation will be made about a case of locating the guest of the room 41 as a specific addressee who moves and changes his location within the hotel, with reference to the flowcharts of FIGS. 4A and 4B.

First, a telephone number corresponding to the extension telephone number of the guest room 4 is stored as an initial value at a portion DN2 associated with the number RRRR in a table TBL1 shown in FIG. 2A. On the other hand, the name of a location attached to the telephone 51 of a hotel facility such as REST is set (indicated by channel or CH), for each facility, in a table (TBL2) within the memory unit 2 by the input means 10, as shown in FIG. 2B. Upon check-in of a guest, his or her profile including the name, sex, name of the organization to which he or she belongs or nationality is stored in the table TBL4 of the memory unit 2, as shown in FIG. 2D in association with the extension telephone 41 of the room 4, and further the destination number to which a call is to be transferred in his or her absence (the attendant console 6 or the front desk telephone 7), or remarks as to whether a call is to be transferred or not to the location is stored in the table TBL3, as shown in FIG. 2C.

As long as the guest is situated in his own room 4, incoming and outgoing calls are processed by the switchboard operation of the electronic automatic exchange between extension telephones in the hotel according to an ordinary exchange program stored in the memory unit 2, thereby handling calls to and from the trunk line automatically through the attendant console 6.

In the event that the guest goes out of his room and moves to a facility 5 in the hotel and waits for an incoming call there, he or she is supposed to dial XYZ-RRRR (the hyphen being a mere separator) by way of the extension telephone 51 at the facility 5 where he has moved. The dialed number is made up of a special number XYZ and the guest's own room number RRRR. When an outgoing or incoming call occurs by dialling, the program in the memory unit 2, shown in FIGS. 4A, 4B, included in an ordinary exchange program is started and analyzes the dialed number (step 201). If step 201 decides that the dialled number has the special number XYZ affixed thereto, the process proceeds to step 210 for registration of guest location. Step 210 searches for a telephone number HHHH of the extension telephone 51 dialling the number XYZ-RRRR. This operation may be performed by the functions of an ordinary trunk exchange. The telephone number HHHH of the extension telephone 51 calling XYZ-RRRR is compared with the telephone number portion RRRR of XYZ-RRRR, excluding the special number portion XYZ, at step 211. If the two numbers fail to coincide with each other, the process is passed to step 212, where the extension number HHHH of the facility 5 where the guest is situated is written in an area DN2 corresponding to RRRR of the table TBL1 of the memory unit 2, thereby to complete the registration of the destination location. After this registration, each incoming call for the telephone number is referenced to each of the tables 2A to 2D sequentially.

Assume that after this registration of a location, the extension telephone 41 of guest room 4 is called by the guest of the room 8 from the extension telephone 81. Dial analysis determines that an incoming call has arrived at step 201, and the process proceeds to step 220 where the area DN2 corresponding to the number RRRR in the table TLB1 is referenced. In the case where the data of DN2 is not RRRR (step 221) and the calling party (room 8) fails to coincide with the destination (attendant console 6) set in the table TBL3 (step 222), then the process proceeds to step 223. Step 223 transfers the call from the extension telephone 81 of the room 8 to the attendant console 6 or the front desk telephone 7 registered with the table TBL3. Then, during the calling or answering at the attendant console 6 or the front desk telephone 7 (as set by the exchange program of the memory unit 2 in advance by the input means 10), the table TBL2 is referenced by the data of DN2 in the table TBL1, thereby to display on the display unit 61 or 71 the information of the facility (indicated as REST) stored in the area CH and the profile information of the guest who has checked in the room associated with RRRR, as stored in the table TBL4. Characters RN designate such data as the room number, name, sex, name of the organization and nationality of the guest, and characters GL the information on the destination, including the, name of the facility and the accessibility of that facility by telephone.

As a result, the operator at the attendant console 6 or the front desk telephone 7 is in a position to confirm the information relating to the location of the guest involved and the data on his or her own person, and thus can offer such services as direct transfer of a call or passing of a message or otherwise as required by the circumstances.

If a call arrives for the guest room 4 from the trunk line while the guest is absent from the room, on the other hand, the call is connected to the attendant console 6 or the front desk telephone 7, and therefore the process proceeds from step 220 to step 222, and if RRRR is dialled for transfer, the process is passed to step 226 in view of the fact that the calling party coincides with the destination (attendant console 6 or the front desk telephone 7) stated in the table TBL3 at step 222. Step 226 references the data in the table TBL2 by means of the data at DN2 in the table TBL1, and like at step 224, indicates on the display units 61, 71 the information on the facility where the guest is located and the profile information corresponding to the number RRRR.

In the case where the guest returns to his room 4 and dials the number XYZ-RRRR, the process proceeds to steps 201 and 210 to search for the number RRRR of the extension telephone 41 from which the number is dialled. Then, step 211 compares the number RRRR of the calling extension telephone 41 with the number XYZ-RRRR, and in view of the fact that the two numbers coincide with each other, it is determined that the guest has returned to his or her room. The process then proceeds to step 213, where the table TBL1 is referenced to RRRR, which is written in the related DN2, thereby to initialize the registration of the guest location.

In the case where a call arrives at the extension telephone 41 (RRRR) of the guest room 4 from the trunk or extension line under this condition, the ordinary exchange is effected at step 225.

According to the present embodiment, a guest who is relocated in a hotel is easily contacted by telephone by a simple process of his or her telephone operation, and thus services to hotel guests are extremely improved.

Further, a guest waiting for a telephone call outside of his or her room may be reached by telephone in a facility other than his or her room in the same hotel, so that the range and time of acts allowed a guest in the hotel are increased for improved guest service. According to the present invention, it is also possible to change the registration of the location of a guest by way of telephone without any special terminal unit or a control unit therefor, and therefore a guest location system is provided at low cost for improved economy of operation of a hotel telephone exchange.

It will be understood that although the present embodiment has been explained with reference to a hotel application, the invention is not limited to such an application but is applicable to various private branch exchanges.

I claim:

1. A method of locating an addressee for a call on a private telephone branch exchange wherein an extension telephone of the private branch exchange is allotted to the addressee, said method comprising the steps of:
   registering the identification of the present location of the addressee by performing a predetermined dialling operation from an extension telephone, other than the extension telephone allotted to the addressee, within the area covered by said private branch exchange;
   storing in a memory the identification of the registered location of the addressee;
   transferring to a switchboard any call directed to the extension telephone allotted to the addressee; and
   indicating at the switchboard the identification of the registered location of the addressee as stored in the memory.

2. A method of locating an addressee according to claim 1, wherein in the case where the call directed to said extension telephone allotted to the addressee is from said switchboard, the present location of the address is indicated on the switchboard without completing the call to said extension telephone allotted to the addressee.

3. A method of locating an addressee according to claim 1, wherein the location of the addressee is registered by performing the predetermined dialling operation from an extension telephone allotted to the present location of the addressee.

4. A method of locating an addressee according to claim 1, wherein said switchboard is an attendant console.

5. A method of locating an addressee according to claim 1, wherein said switchboard is a hotel front desk telephone.

6. A method of locating an addressee according to claim 1, wherein said predetermined dialling operation comprises dialling a combination of a specific code and the number of said extension telephone allotted to the addressee.

7. A method of locating an addressee according to claim 1, wherein the present location of the addressee is indicated by indicating the number of the extension telephone from which the predetermined dialling operation was performed.

8. A method of locating an addressee according to claim 1, wherein the present location of the addressee is indicated by storing the name of a facility for each extension telephone within said private branch exchange, and indicating a name of the facility at the extension telephone from which the predetermined dialing operation was performed.

9. A method of locating an addressee according to claim 7,
further comprising storing in said memory information about the addressee; and
wherein the present location of the address is indicated by indicating the stored information, together with the number of said extension telephone from which the predetermined dialling operation was performed.

10. A method of locating an addressee according to claim 9, wherein the information on the addressee includes the name and sex of the addressee.

11. A method of locating an addressee according to claim 3, wherein said predetermined dialling operation comprises dialing a specific code and the number of the extension telephone allotted to the addressee.

12. A method of locating an addressee according to claim 1, further comprising transferring the forwarded call from said switchboard to the extension telephone allotted to the present location of the addressee as stored in the memory.

13. An addressee locating apparatus for a private telephone branch exchange, comprising:
switchboard means, including a character display section;
memory means adapted to store the identification of the location of each extension telephone of said private branch exchange and a profile of each of a plurality of specific addressees;
input means adapted to input the identification of the location of each extension telephone of said private branch exchange and the profile of each of said plurality of addressees to said memory means for storage therein; and
switchboard control means responsive to a predetermined dialling operation from an extension telephone, other than an extension telephone allotted to an addressee, for inputting to said memory means an identification of the present location of the addressee for storage therein, transferring a call directed to the extension telephone allotted to the addressee to said switchboard, and indicating the stored identification of the present location of the addressee on said character display section.

14. An addressee locating apparatus according to claim 13, wherein said switchboard control means includes means responsive to a call directed to said extension telephone allotted to the addressee from the switchboard to display on said character display section the present location of the addressee without completing the call directed to said extension telephone allotted to the addressee.

15. An addressee locating apparatus according to claim 13, wherein said input means comprises an extension telephone allotted to the present location of the addressee.

16. An addressee locating apparatus according to claim 13, wherein said switchboard control means includes means for causing the identification of the location of the addressee to be displayed on said character display section in response to said switchboard answering the transferred call.

17. An addressee locating apparatus according to claim 13, wherein said switchboard comprises an attendant console.

18. An addressee locating apparatus according to claim 13, wherein said switchboard comprises a hotel front desk telephone.

19. An addressee locating apparatus according to claim 13, wherein said switchboard control means is responsive to a combination of a specific code and the number of the extension telephone allotted to the addressee.

20. An addressee locating apparatus according to claim 13, wherein said character display section is adapted to indicate the stored information by displaying the number of an extension telephone allotted to the present location of the addressee.

21. An addressee locating apparatus according to claim 13, wherein:
said memory means is adapted to store the name of a facility to which each extension telephone is allotted within said private branch exchange;
said input means comprises an extension telephone allotted to the present location of the addressee; and
said character display section is adapted to display the stored name of the facility at the extension telephone allotted to the location from which the predetermined dialing operation is performed.

22. An addressee locating apparatus according to claim 20, wherein said character display section is adapted further to display the stored profile of the addressee to whom is allotted the extension telephone to which the call was directed.

23. An addressee locating apparatus according to claim 22, wherein said input means is adapted to store the name and sex of the addressee in said memory means.

24. An addressee locating apparatus according to claim 15, wherein said extension telephone allotted to the present location of the addressee is adapted to store the identification by dialing a combination of a specific code and the number of the extension telephone allotted to the addressee.

* * * * *